United States Patent Office 3,250,777
Patented May 10, 1966

3,250,777
BIS-ARYLSULFONYLUREAS
John B. Wright, Kalamazoo, Mich., assignor to The Upjohn Company, Kalamazoo, Mich., a corporation of Delaware
No Drawing. Filed Mar. 23, 1964, Ser. No. 354,156
4 Claims. (Cl. 260—268)

The present invention relates to novel bis-arylsulfonylureas and pharmacologically acceptable acid addition salts thereof.

The bis-arylsulfonylureas of the present invention can be represented by the formula:

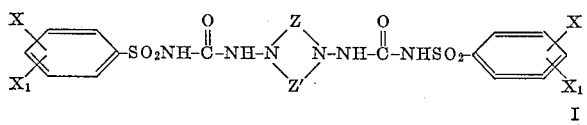

I wherein X and $X_1$ represent hydrogen; halogen, e.g., chloro, bromo, fluoro, and the like; alkyl of one to eight carbon atoms, inclusive, e.g., methyl, ethyl, isopropyl, butyl, isobutyl, isopentyl, hexyl, heptyl, octyl, and the like; alkoxy of one to eight carbon atoms, inclusive, e.g., methoxy, ethoxy, propoxy, butoxy, hexyloxy, octyloxy, and the like; primary amino ($NH_2$); and alkanoyl of two to five carbon atoms, inclusive, e.g., acetyl, propionyl, butyryl, valeryl, and the like; and

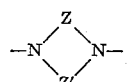

represents unsubstituted

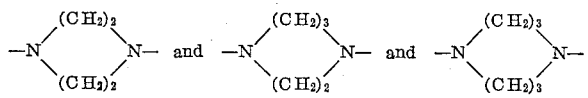

and C-monoalkyl and C-polyalkyl derivatives thereof wherein alkyl is of one to two carbon atoms, inclusive.

The novel compounds of the present invention are orally active antidiabetic agents useful for lowering blood sugar in mammals, especially humans, to a safe level.

The novel compounds of the present invention can be prepared by reacting an arylsulfonylurethane with an amine in accordance with the general process disclosed in U.S. Patent 3,063,903, but more specifically by reacting an arylsulfonylurethane with a saturated heterocyclic amine having the formula:

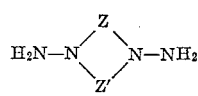

II wherein

has the above meaning.

The saturated heterocyclic amines can be prepared by nitrosating a heterocyclic amine of the formula:

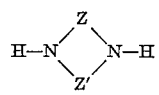

III wherein

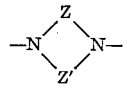

has the above meaning, with two moles of nitrous acid and reducing the corresponding dinitroso derivative having the formula:

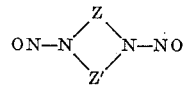

IV wherein

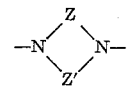

has the above meaning. The reduction can be carried out with sodium and ethanol or zinc and acetic acid in the manner disclosed by Evans, J. Chem. Soc. 4029, 1963, who prepared 1,4-diaminopiperazine by reducing 1,4-dinitrosopiperazine with zinc and acetic acid, or by catalytic reduction as described by Smith et al., Ind. and Eng. Chem., Prod. and Res. Develop. 1, 117, 1963.

The preparation of compounds of the invention having primary amino ($NH_2$) substitution on the benzene ring, e.g., 1,4-bis-[3-(aminobenzenesulfonyl)ureido]piperazine involves the utilization of a nitro-substituted arylsulfonylurethane, e.g., nitrobenzenesulfonylurethane, to produce the intermediate 1,4 - bis - [3-(nitrobenzenesulfonyl)ureido]piperazine which can then be catalytically hydrogenated, e.g., using palladium-on-charcoal catalyst, to produce the desired 1,4 - bis - [3-(aminobenzenesulfonyl)ureido]piperazine.

The starting arylsulfonylurethanes, many of which are known, can be prepared as disclosed in U.S. Patent 3,063,903. They can be represented by the formula:

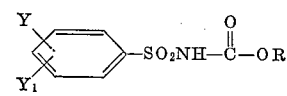

V wherein Y and $Y_1$ represent hydrogen, nitro, and also halogen, alkyl, alkoxy, and alkanoyl as defined above for X and $X_1$, and R represents alkyl, preferably methyl or ethyl.

Pharmacologically acceptable acid addition salts of the present invention can be prepared from the bis-arylsulfonylurea free bases by conventional methods. For example, the free base can be dissolved in an aqueous solution of the appropriate acid and the salt can be isolated by evaporation of the solution. Alternatively, the free base dissolved in an organic solvent such as methanol, ethanol, ethyl acetate, ether, and the like, can be treated with the appropriate acid and according to the nature of the solvent employed, the desired salt will separate spontaneously or can be precipitated by the addition of a solvent in which the salt is insoluble. Suitable acids include hydrochloric, sulfuric, hydrobromic, phosphoric, tartaric, acetic, citric, succinic, maleic, benzoic, salicylic, and the like.

The following examples are illustrative of the products of the present invention but are not to be construed as limiting.

EXAMPLE 1

*1,4-bis-[3-(p-methylbenzenesulfonyl)ureido]piperazine*

A mixture of 30 g. (0.131 mole) of p-methylbenzenesulfomethylurethane and 7.61 g. (0.066 mole) of 1,4-diaminopiperazine was heated in an oil bath at 130° C. for two hours in a flask fitted with a condenser placed downward for distillation. Volatile material was removed at 100 mm. pressure for one hour and at 20 mm. pressure for two hours while keeping the oil bath at 130° C. The residue was cooled and recrystallized from ethanol to yield 1,4-bis-[3-(p-methylbenzenesulfonyl)ureido]piperazine. The 1,4-bis-[3-(p-methylbenzenesulfonyl)ureido]piperazine was dissolved in ethanol containing 20% dimethylformamide and gaseous hydrogen chloride added to produce 1,4-bis-[3-(p-methylbenzenesulfonyl)ureido]piperazine dihydrochloride. The product was isolated by removal of ethanol and most of the dimethylformamide under reduced pressure, adding anhydrous ether, and recovering the compound by filtration.

Similarly, 1,4 - bis-[3-(p-ethylbenzenesulfonyl)ureido]piperazine, 1,4 - bis-[3-(p-propylbenzenesulfonyl)ureido]piperazine, 1,4 - bis-[3-(p-butylbenzenesulfonyl)ureido]piperazine, 1,4 - bis-[3-(p-pentylbenzenesulfonyl)ureido]piperazine, 1,4 - bis-[3-(p-hexylbenzenesulfonyl)ureido]piperazine, 1,4 - bis-[3-(p-heptylbenzenesulfonyl)ureido]piperazine, and 1,4-bis-[3-(p-octylbenzenesulfonyl)ureido]piperazine are prepared by substituting in Example 1 p-ethylbenzenesulfomethylurethane, p - propylbenzenesulfomethylurethane, p-butylbenzenesulfomethylurethane, p-pentylbenzenesulfomethylurethane, p-hexylbenzenesulfomethylurethane, p-heptylbenzenesulfomethylurethane, and p-octylbenzenesulfomethylurethane for p-methylbenzenesulfomethylurethane.

EXAMPLE 2

*1,4-bis-[3-(p-chlorobenzenesulfonyl)ureido]piperazine*

In the same manner as shown in Example 1, 1,4-bis-[3-(p-chlorobenzenesulfonyl)ureido]piperazine was prepared by substituting p-chlorobenzenesulfomethylurethane for p-methylbenzenesulfomethylurethane.

The 1,4-bis-[3-(p-chlorobenzenesulfonyl)ureido]piperazine was reacted with tartaric acid to produce 1,4-bis-[3-(p-chlorobenzenesulfonyl)ureido]piperazine tartrate.

Similarly, 1,4-bis-[3-(m-chlorobenzenesulfonyl)ureido]piperazine, 1,4-bis-[3-(p-bromobenzenesulfonyl)ureido]piperazine, 1,4 - bis-[3-(p-fluorobenzenesulfonyl)ureido]piperazine, and 1,4-bis-[3-(m-chloro-p-methylbenzenesulfonyl)ureido]piperazine are prepared by substituting in Example 1 m-chlorobenzenesulfomethylurethane, p-bromobenzenesulfomethylurethane, p - fluorobenzenesulfomethylurethane, and m-chloro - p - methylbenzenesulfomethylurethane for p-methylbenzenesulfomethylurethane.

EXAMPLE 3

*1,4-bis-[3-(p-methylbenzenesulfonyl)ureido] homopiperazine*

1,4-diaminohomopiperazine was prepared by the general procedure of Evans et al., supra, starting with homopiperazine instead of piperazine.

In the same manner as shown in Example 1, 1, 4-bis-[3-(p - methylbenzenesulfonyl)ureido]homopiperazine was prepared by substituting 1,4-diaminohomopiperazine for 1,4-diaminopiperazine.

The 1,4-bis-[3-(p-methylbenzenesulfonyl)ureido]homopiperazine was reacted with maleic acid to produce 1,4-bis - [3-(p-methylbenzenesulfonyl)ureido]homopiperazine maleate.

Similarly, 1,4 - bis-[3-(p-ethylbenzenesulfonyl)ureido]homopiperazine, 1,4 - bis-[3-(m-ethoxybenzenesulfonyl)ureido]homopiperazine, 1,4 - bis-[3-(p-hexylbenzenesulfonyl)ureido]homopiperazine, 1,4 - bis-[3-(p-chlorobenzenesulfonyl)ureido]homopiperazine, and 1,4-bis-[3-(m-bromobenzenesulfonyl)ureido] homopiperazine are prepared by substituting in Example 1 p-ethylbenzenesulfomethylurethane, m-ethoxybenzenesulfomethylurethane, p-hexylbenzenesulfomethylurethane, p-chlorobenzenesulfomethylurethane, and m-bromobenzenesulfomethylurethane for p-methylbenzenesulfomethylurethane, and also substituting 1,4-diaminohomopiperazine for 1,4-diaminopiperazine.

EXAMPLE 4

*1,4-bis-[3-(p-methylbenzenesulfonyl)ureido]-2-methylhomopiperazine*

In the same manner as shown in Example 1, 1,4-bis-[3-(p - methylbenzenesulfonyl)ureido]-2-methylhomopiperazine was prepared by substituting 1,4-diamino-2-methylhomopiperazine for 1,4-diaminopiperazine.

1,4-bis-[3-(p-methylbenzenesulfonyl)ureido]-2-methylhomopiperazine was reacted with citric acid to produce 1,4 - bis-[3-(p-methylbenzenesulfonyl)ureido]-2-methylhomopiperazine citrate.

Similarly, 1,4-bis-[3-(p-propylbenzenesulfonyl)ureido]-2-methylhomopiperazine, 1,4-bis-[3-(p-methoxybenzenesulfonyl)ureido]-2-methylhomopiperazine, and 1,4-bis-[3-(m - chlorobenzenesulfonyl)ureido]-2-methylhomopiperazine are prepared by substituting in Example 1 p-propylbenzenesulfomethylurethane, p - methoxybenzenesulfomethylurethane, and m - chlorobenzenesulfomethylurethane for p-methylbenzenesulfomethylurethane, and also substituting 1,4-diamino-2-methylhomopiperazine for 1,4-diamino-piperazine.

EXAMPLE 5

*1,5-bis-[3-(chlorobenzenesulfonyl)ureido] octahydro-1,5-diazocine*

1,5-diamino-octahydro-1,5-diazocine was prepared by the general procedure of Evans et al., supra, starting with octahydro-1,5-diazocine instead of piperazine.

In the same manner as shown in Example 1, 1,5-bis-[3-(p-chlorobenzenesulfonyl)ureido]octahydro - 1,5 - diazocine was prepared by substituting p-chlorobenzensulfomethylurethane and 1,5-diamino-octahydro-1,5-diazocine for p - methylbenzenesulfomethylurethane and 1,4 - diaminopiperazine.

1,5-bis[3-(p - chlorobenzensulfonyl)ureido]octahydro-1,5-diazocine was reacted with salicylic acid to produce 1,5-bis - [3 - (p-chlorobenzensulfonyl)ureido]octahydro-1,5-diazocine salicylate.

Similarly, 1,5-bis-[3-(p-bromobenzensulfonyl)ureido]octahydro-1,5-diazocine, 1,5-bis-[3-(p - methylbenzensulfonyl)ureido]octahydro-1,5-diazocine, 1,5-bis-[3-(p - propylbenzensulfonyl)ureido]octahydro-1,5 - diazocine, and 1,5-bis-[3 - (p - hexylbenzensulfonyl)ureido]octahydro-1,5-diazocine are prepared by substituting in Example 1 p-bromobenzenesulfomethylurethane, p-methylbenzensulfomethylurethane, p-propylbenzenesulfomethylurethane, and p-hexylbenzenesulfomethylurethane for p-methylbenzenesulfomethylurethane, and also substituting 1,5-diaminooctahydro-1,5-diazocine for 1,4 - diaminopiperazine.

EXAMPLE 6

*1,4-bis[3-(p-acetylbenzenesulfonyl)ureido]-2,2-dimethylhomopiperazine*

In the same manner as shown in Example 1, 1,4-bis-[3-(p - acetylbenzenesulfonyl)ureido] - 2,2 - dimethylhomopiperazine was prepared by substituting p-acetylbenzensulfomethylurethane and 1,4-diamino-2,2-dimethylhomopiperazine for p-methylbenzenesulfomethylurethane and 1,4-diaminopiperazine.

Similarly, 1,4-bis - [3 - (p - propionylbenzensulfonyl)ureido]-2,2-dimethylhomopiperazine, 1,4-bis-[3 - (p - butyrylbenzenesulfonyl)ureido] - 2,2 - dimethylhomopiperazine, and 1,4-bis-[3-(p-valerylbenzenesulfonyl)ureido]-2,2-dimethylhomopiperazine are prepared by substituting in Example 1 p-propionylbenzensulfomethylurethane, p-butyrylbenzenesulfomethylurethane, and p-valerylbenzenesulfomethylurethane for p-methylbenzenesulfomethylurethane, and also substituting 1,4-diamino-2,2-dimethylhomopiperazine for 1,4-diaminopiperazine.

EXAMPLE 7

*1,4-bis-[3-(p-methoxylbenzenesulfonyl)ureido]-5-methylhomopiperazine*

In the same manner as shown in Example 1, 1,4-bis-[3-(p-methoxybenzenesulfonyl)ureido]-5 - methylhomopiperazine was prepared by substituting p-methoxybenzenesulfomethylurethane and 1,4-diamino-5-methylhomopiperabine for p-methylbenzenesulfomethylurethane and 1,4-diaminopiperazine.

Similarly, 1,4-bis-[3-(p-ethoxybenzenesulfonyl)ureido]-6-methylhomopiperazine, 1,4-bis-[3-(p-hexyloxybenzenesulfonyl)ureido]-6-methylhomopiperazine, 1,4-bis-[3-(p-heptyloxybenzenesulfonyl)ureido]-6 - methylhomopiperazine, and 1,4-bis-[3-(p-octyloxybenzenesulfonyl)ureido]-6-methylhomopiperazine are prepared by substituting in Example 1 p-ethoxybenzenesulfomethylurethane, p-hexyloxybenzenesulfomethylurethane, p - heptyloxybenzenesulfomethylurethane, and p - octyloxybenzensulfomethylurethane for p-methylbenzenesulfomethylurethane, and also substituting 1,4-diamino-6-methylhomopiperazine for 1,4-diaminopiperazine.

EXAMPLE 8

*1,4-bis-[3-(p-butoxybenzenesulfonyl)ureido]-2-methylpiperazine*

In the same manner as shown in Example 1, 1,4-bis-[3-(p-butoxylbenzenesulfonyl)ureido] - 2 - methylpiperazine was prepared by substituting p-butoxybenzensulfomethylurethane and 1,4-diamino-2-methylpiperazine for p-methylbenzensulfomethylurethane and 1,4-diaminopiperazine.

Similarly, 1,4-bis-[3-(m-butylbenzenesulfonyl)ureido]-2,3-dimethylpiperazine, 1,4-bis-[3-(p-methoxybenzenesulfonyl)ureido]-2,5-dimethylpiperazine, 1,4-bis - [3 - (p-chlorobenzenesulfonyl)ureido]-2,6 - dimethylpiperazine, 1,4-bis-[3-(p - bromobenzenesulfonyl)ureido] - 2 - ethylpiperazine, 1,4-bis-[3-(p-ethoxybenzenesulfonyl)ureido]-2-ethyl-5-methylpiperazine, and 1,4-bis-[3 - (p-pentyloxybenzenesulfonyl)ureido]-2-ethyl-6 - methylpiperazine are prepared by substituting in Example 1 m-butylbenzenesulfomethylurethane and 1,4-diamino-2,3-dimethylpiperazine; p-methoxybenzenesulfomethylurethane and 1,4-diamino-2,5-dimethylpiperazine; p - chlorobenzensulfomethylurethane and 1,4-diamino-2,6-dimethylpiperazine; p-bromobenzenesulfomethylurethane and 1,4 - diamino - 2 - ethylpiperazine; p-ethoxybenzenesulfomethylurethane and 1,4-diamino-2-ethyl-5-methylpiperazine; and p-pentyloxybenzenesulfomethylurethane and 1,4-diamino - 2 - ethyl - 6-methylpiperazine, for p - methylbenzenesulfomethylurethane and 1,4-diaminopiperazine.

EXAMPLE 9

*1,4-bis-[3-p(aminobenzenesulfonyl)ureido]piperazine*

In the same manner as shown in Example 1, 1,4-bis-[3-(p-nitrobenzenesulfonyl)ureido]piperazine was prepared by substituting p-nitrobenzensulfomethylurethane for p-methylbenzenesulfomethylurethane.

Hydrogenation of 1,4-bis-[3-(p-nitrobenzenesulfonyl)ureido] piperazine in a 1:30 ammonium hydroxide solution with 10% palladium-on-charcoal catalyst resulted in the production of 1,4-bis-[3-(p-aminobenzenesulfonyl)ureido]piperazine.

Similarly, 1,4-bis-[3-(p-nitrobenzenesulfonyl)ureido]homopiperazine and 1,5-bis-[3-(p-nitrobenzenesulfonyl)ureido]octahydro-1,5-diazocine are prepared by substituting in Example 1 p-nitrobenzensulfomethylurethane, and 1,4-diaminohomopiperazine and 1,5-diamino-octahydro-1,5-diazocine, respectively, for p-methylbenzenesulfomethylurethane and 1,4-diaminopiperazine. The 1,4-bis-[3-(p-nitrobenzenesulfonyl)ureido]homopiperazine and 1,5-bis-[3 - (p-nitrobenzenesulfonyl)ureido]octahydro-1,5-diazocine are hydrogenated in the manner disclosed in Example 9 to produce 1,4-bis-[3-(p-aminobenzenesulfonyl)ureido] homopiperazine and 1,5-bis-[3-(p-aminobenzenesulfonyl)ureido]octahydro-1,5-diazocine.

EXAMPLE 10

*1,5-bis-[3-(p-methoxybenzenesulfonyl)ureido]octahydro-1,5-diazocine*

In the same manner as shown in Example 1, 1,5-bis-[3-(p - methoxybenzenesulfonyl)ureido]octahydro - 1,5-diazocine was prepared by substituting p-methoxybenzenesulfomethylurethane and 1,5-diamino-octahydro-1,5-diazocine for p-methylbenzenesulfomethylurethane and 1,4-diaminopiperazine.

Similarly, 1,5-bis-[3-(p-ethoxybenzenesulfonyl)ureido]octahydro-1,5-diazocine, 1,5-bis-[3-(p-propoxybenzenesulfonyl)ureido]octahydro-1,5-diazocine, 1,5-bis-[3-(p-butoxybenzenesulfonyl)ureido]octahydro-1,5-diazocine, 1,5-bis - [3-(m-pentyloxybenzenesulfonyl)ureido]octahydro-1,5-diazocine, 1,5-bis-[3-(p-acetylbenzenesulfonyl)ureido]octahydro-1,5-diazocine, 1,5-bis-[3-(p-propionylbenzenesulfonyl)ureido]octahydro-1,5-diazocine, and 1,5-bis-[3 - (p-butyrylbenzenesulfonyl)ureido]octahydro-1,5-diazocine are prepared by substituting in Example 1 p-ethoxybenzenesulfomethylurethane, p-propoxybenzenesulfomethylurethane, p-butoxybenzenesulfomethylurethane, m - pentyloxybenzenesulfomethylurethane, p-acetylbenzenesulfomethylurethane, p-propionylbenzenesulfomethylurethane, and p-butyrylbenzenesulfomethylurethane for p-methylbenzenesulfomethylurethane, and also substituting 1,5-diamino-octahydro-1,5-diazocine for 1,4-diaminopiperazine.

EXAMPLE 11

*1,4-bis-[3-(benzenesulfonyl)ureido]piperazine*

In the same manner as disclosed in Example 1, 1,4-bis-[3-(benzenesulfonyl)ureido]piperazine was prepared by substituting benzenesulfomethylurethane for p-methylbenzenesulfomethylurethane.

Similarly, 1,4-bis-[3-(benzenesulfonyl)ureido]-5-methylhomopiperazine and 1,5-bis-[3-benzenesulfonyl)ureido] octahydro-1,5-diazocine are prepared by substituting in Example 1 benzenesulfomethylurethane, and 1,4-diamino-5-methylhomopiperazine and 1,5-diamino-octahydro-1,5-diazocine, respectively, for p-methylbenzenesulfomethylurethane and 1,4-diaminopiperazine.

EXAMPLE 12

*1,4-bis-[3-(p-acetylbenzenesulfonyl)ureido] piperazine*

In the same manner as shown in Example 1, 1,4-bis-[3-(p-acetylbenzenesulfonyl)ureido]piperazine was prepared by substituting p-acetylbenzenesulfomethylurethane for p-methylbenzenesulfomethylurethane.

Similarly, 1,4-bis-[3-(o-propionylbenzenesulfonyl)ureido]piperazine, 1,4-bis-[3-(m-butyrylbenzenesulfonyl)ureido]piperazine, and 1,4-bis-[3-(p-valerylbenzenesulfonyl)ureido]piperazine are prepared by substituting in Example 1 o-propionylbenzenesulfomethylurethane, m-butyrylbenzenesulfomethylurethane, and p-valerylbenzenesulfomethylurethane for p-methylbenzenesulfomethylurethane.

As indicated hereinbefore, the compounds of the present invention are useful for the treatment of diabetes perorally and for this purpose the active compounds are associated with a pharmaceutically acceptable carrier.

For oral administration, the active compounds can be administered in liquid or solid dosage forms. Solid forms include capsules, tablets, powders, pills, and the like, and liquid forms include suitably flavored aqueous suspensions and solutions (depending on concentration desired), and flavored oil suspensions and solutions wherein edible oils such as corn oil, cottonseed oil, coconut oil, peanut oil, sesame oil, or mixtures of these, and the like, can be employed.

For preparing compositions such as tablets and other compressed formulations, the composition can include any compatible and edible tableting material used in pharamaceutical practice such as corn starch, lactose, dibasic calcium phosphate, stearic acid, magnesium stearate, talc, methyl cellulose, and the like.

Similarly, the compounds of the present invention can be mixed with suitable adjuvants for the preparation of resorbable hard gelatin or soft capsules utilizing conventional pharmaceutical practices.

I claim:

1. A compound selected from the group consisting of (1) a bis-arylsulfonylurea having the formula:

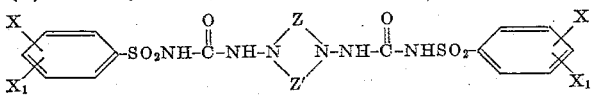

wherein X and $X_1$ are selected from the group consisting of hydrogen, halogen, alkyl of one to eight carbon atoms, inclusive, alkoxy of one to eight carbon atoms, inclusive, alkanoyl of two to five carbon atoms, inclusive, and primary amino ($NH_2$); and

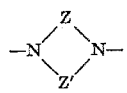

is selected from the group consisting of unsubstituted

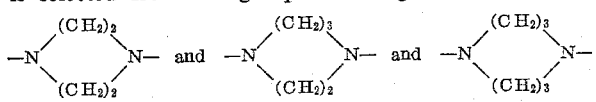

and C-monoalkyl and C-polyalkyl derivatives thereof wherein alkyl is of one to two carbon atoms, inclusive; and (2) pharmacologically acceptable acid addition salts thereof.

2. A bis-arylsulfonylurea having the formula:

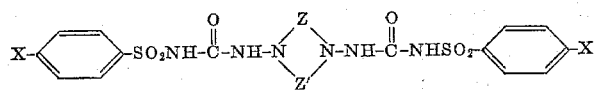

wherein X is alkyl of one to eight carbon atoms, inclusive, and

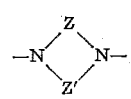

is selected from the group consisting of unsubstituted

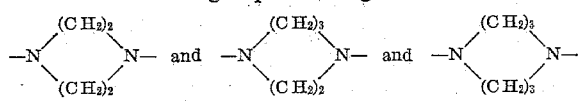

and C-monoalkyl and C-polyalkyl derivatives thereof wherein alkyl is of one to two carbon atoms, inclusive.

3. A bis-arylsulfonylurea having the formula:

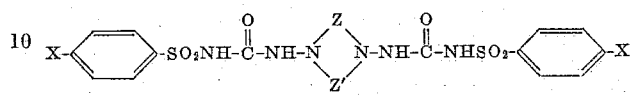

wherein X is halogen, and

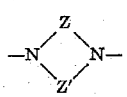

is selected from the group consisting of unsubstituted

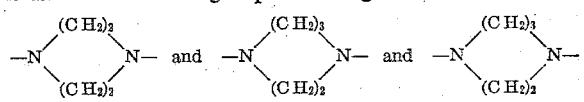

and C-monoalkyl and C-polyakyl derivatives thereof wherein alkyl is of one to two carbon atoms, inclusive.

4. A bis-arylsulfonylurea having the formula:

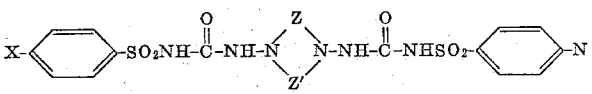

wherein X is alkanoyl of two to five carbon atoms, inclusive, and

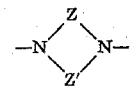

is selected from the group consisting of unsubstituted

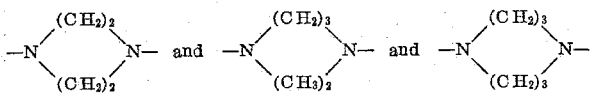

and C-monoalkyl and C-polyalkyl derivatives thereof wherein alkyl is of one to two carbon atoms, inclusive.

No references cited.

HENRY R. JILES, *Acting Primary Examiner.*